July 3, 1956   R. B. KNILL ET AL   2,752,979
PUNCTURE SEALING INNER TUBE
Filed June 17, 1953

INVENTORS
JOHN J. HOESLY
BY ROBERT B. KNILL

R. L. Miller
ATTORNEY

United States Patent Office 2,752,979
Patented July 3, 1956

2,752,979

PUNCTURE SEALING INNER TUBE

Robert B. Knill and John J. Hoesly, Akron, Ohio, assignors, by mesne assignments, to The Goodyear Tire & Rubber Company, a corporation of Ohio Application June 17, 1953, Serial No. 362,180

2 Claims. (Cl. 152—347)

This invention relates broadly to compositions useful for the sealing of punctured gas-retaining chambers. More specifically it relates to puncture-sealing compositions useful in self-sealing inner tubes for pneumatic tires and self-sealing pneumatic tires of the tubeless variety. The invention also relates to the tires and tubes obtainable by the use of the improved sealing composition.

The use of sealing compositions for tires and tubes is well known. The preparation of sealing compositions of preferred types involves the use of a rubber compound which is partially vulcanized. The sealing composition cannot be fully vulcanized because it would not seal properly. A partial vulcanization is necessary, however, so that the sealing composition will not flow toward the tread-center area under the centrifugal forces developed during the operation of the assembly. It has been observed that, in effecting this partial vulcanization in the rubber-containing sealing composition, porosity develops which takes the form of large pores located throughout the sealant layer. It has likewise been observed that this porosity adversely affects the sealing action of the sealant composition.

It is, therefore, an object of this invention to provide an improved sealing composition in which the porosity developed during this partial vulcanization is held to a minimum. It is an additional object of this invention to reduce the porosity in the sealant layer of self-sealing pneumatic tires of the tubeless type and of puncture-sealing inner tubes without changing or adding to the number of production steps required in the fabrication of the particular article involved. Another object is to provide for improved puncture-sealing tubeless tires and puncture-sealing inner tubes. Other objects will appear as the description proceeds.

These objects are accomplished, according to the practice of this invention, by mixing the rubber component of the sealing composition with active carbon before the sealant layer is built into the body of the article being made. This reduces the porosity of the partially vulcanized sealant and, particularly, the size of the pores, whereby the sealing properties of the sealing layer are much improved. The amount of active carbon used in conjunction with the rubber component may vary over a wide range but it is preferred to use approximately 2 to 10 parts of active carbon by weight per 100 parts of rubber. Amounts of active carbon in excess of 10 parts by weight, while resulting in a useful compound, do not appreciably add to the reduction of porosity in the partially cured sealing composition.

The term "active carbon" or "activated carbon" is well known in the art as denoting carbon which has been activated as by heating to high temperatures (in the range of from 800 to 900° C.) by the use of steam or hot carbon dioxide. The carbon to be activated is usually produced by the destructive distillation of wood, peat, lignite, nut shells, bones, vegetable or other carbonaceous matter. The actual carbon content in the active carbons varies, depending upon the particular material used in the production thereof, from about 10% in bone charcoal to 90% for some wood chars the balance being inert materials for the purposes of this invention. The preparation of active carbon is fully described in the book "Active Carbon" by J. W. Hassler published in 1951 by The Chemical Publishing Co.

The invention will be more readily understood with respect to the accompanying illustrative drawings.

Figure 1:
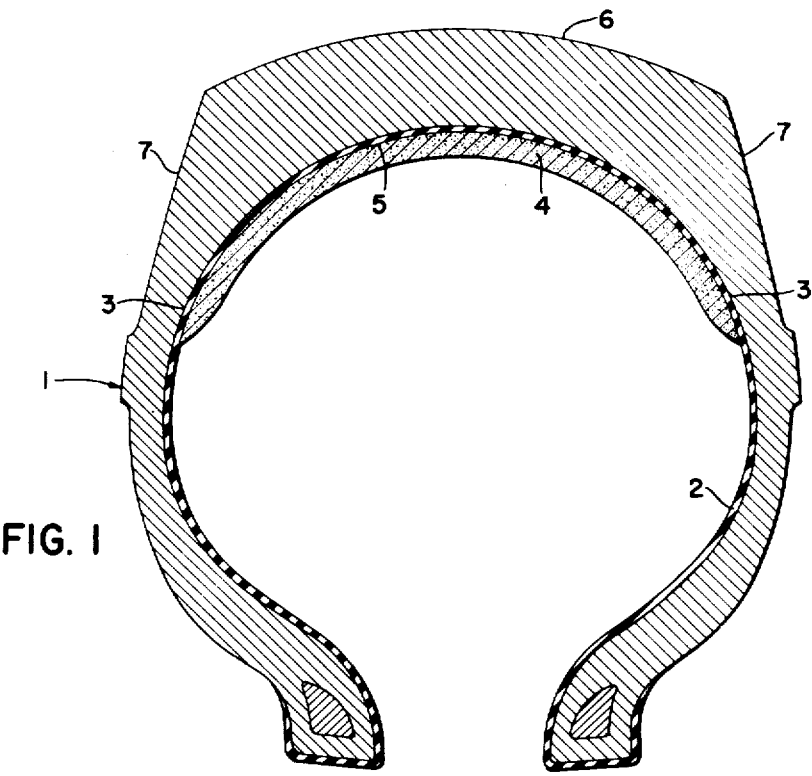
Fig. 1 is a cross section of a self-sealing pneumatic tire of the tubeless variety.

Fig. 1 shows a tire casing 1 with a liner 2 adhered to the inner surface 3 thereof. A puncture-sealing layer 4 the composition of which pertains to the subject matter of this invention is adhered to the inner surface 5 of the liner 2 and covers approximately that area of the inner surface adjacent to the normal puncture zone of the tire, i. e. its complete tread surface 6 and at least part of the sidewall area 7. The material used for the liner 2 can be any rubber-like material adhesively compatible with the inner surface 3 of the tire carcass 1. For instance the liner material could be natural rubber, butyl rubber, the rubber-like copolymers of butadiene and styrene or mixtures of two or more of these.

Figure 2:
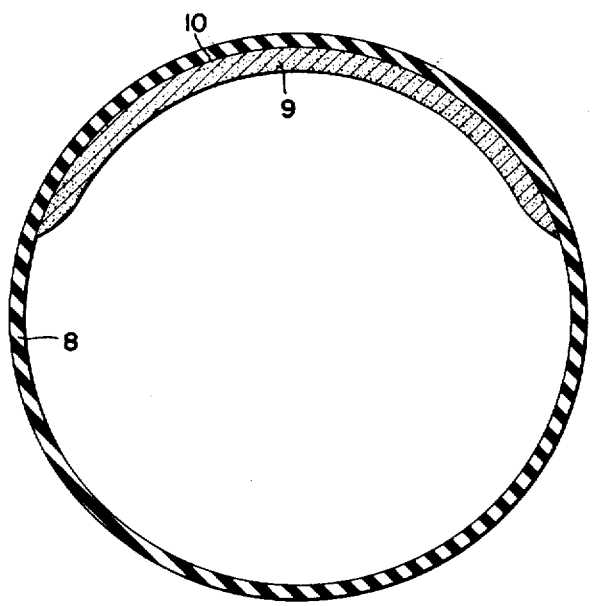
Fig. 2 is a cross section of a self-sealing single-chambered inner tube for a pneumatic tire.

Fig. 2 shows an air-retaining member or inner tube 8 with the sealant layer 9 adhered to the inner surface 10 thereof. The sealant layer 9 covers approximately that area of the inner tube adjacent to the normal puncture zone of the tire with which it is used. The material employed as the outer air-retaining member 8 may be any rubber-like material adhesively compatible with the sealant layer 9 such as natural rubber, butyl rubber, the rubber-like copolymers of butadiene and styrene or mixtures of two or more of these.

While the invention has been particularly described in Fig. 2 as applicable to single-chambered inner tubes it should be understood that the practice of this invention is likewise applicable to tubes of the multi-chambered variety such as those described in United States Patent 2,173,065, issued September 12, 1939, to Walter J. Lee.

The rubber component of the sealing composition may be any elastomeric material, hereinafter referred to as a rubber, such as natural rubber, reclaimed rubber, polychloroprene, the rubber-like copolymers of butadiene and styrene, the rubber-like copolymers resulting from the polymerization of a major proportion of an iso-olefin containing from 4 to 7 carbon atoms, such as isobutylene, and a minor proportion of a multi-olefin containing from 4 to 8 carbon atoms, such as butadiene or isoprene, known as butyl rubber, or mixtures of two or more of these polychloroprene or neoprene is the elastomeric product resulting from the polymerization of chloroprene.

Set forth below is a recipe showing a conventional sealing composition prepared according to the practice of this invention. Parts are by weight:

| | |
|---|---|
| Butyl rubber | 100.00 |
| Iron oxide | 30.00 |
| Whiting | 10.00 |
| Active carbon | 5.00 |
| Plasticizer | 10.00 |
| Stearic acid | 1.00 |
| Zinc oxide | 3.00 |
| Selenium dimethyl dithiocarbamate | .40 |
| Sulfur | .75 |
| | 160.15 |

As a partial or full replacement for the butyl rubber in the recipe shown above there may be used any of the rubbers mentioned above, such as natural rubber, reclaimed rubber, polychloroprene, the rubber-like copolymers of butadiene and styrene or mixtures of these.

It has been observed that the use of the active carbon in a sealing composition such as that shown above results in the production of an improved sealant layer for either a puncture-sealing tube intended to be used in a tire casing or for a self-sealing pneumatic tire of the tubeless type, the porosity in either case being materially reduced as compared with a sealing element not containing the active carbon. Such improvement, as mentioned, is attributed to the reduction in the number and size of the individual pores developed in the partially vulcanized sealant layer brought about by the inclusion of activated carbon in the sealant compound.

While certain representative embodiments and details have been shown for the purpose of illustrating the invention, it will be apparent to those skilled in this art that various changes and modifications may be made therein without departing from the spirit or scope of the invention.

We claim:

1. A self-sealing pneumatic inner tube comprising an outer air-retaining member and an inner layer of partially vulcanized rubber sealant composition adhered to said outer member and covering that area of said outer member corresponding to the puncture zone of said inner tube, said sealant composition comprising from 2 to 10 parts by weight of active carbon per 100 parts by weight of rubber.

2. A self-sealing pneumatic inner tube defined by claim 1 in which the sealant composition comprises approximately 5 parts by weight of active carbon per 100 parts by weight of rubber.

References Cited in the file of this patent

UNITED STATES PATENTS

| Re. 15,957 | Fulton | Dec. 2, 1924 |
| 1,433,099 | Rose | Oct. 24, 1922 |
| 1,511,984 | Spear | Oct. 14, 1924 |
| 1,522,954 | Hamister | Jan. 13, 1925 |
| 2,566,384 | Tilton | Sept. 4, 1951 |
| 2,640,035 | Brown et al. | May 26, 1953 |

UNITED STATES PATENT OFFICE

CERTIFICATE OF CORRECTION

Patent No. 2,752,979                              July 3, 1956

Robert B. Knill et al.

It is hereby certified that error appears in the printed specification of the above numbered patent requiring correction and that the said Letters Patent should read as corrected below.

Column 2, line 52, for "these polychloroprene" read -- these. Polychloroprene --.

Signed and sealed this 28th day of August 1956.

(SEAL)
Attest:

KARL H. AXLINE
Attesting Officer

ROBERT C. WATSON
Commissioner of Patents